United States Patent
Taferner

(10) Patent No.: US 12,366,498 B2
(45) Date of Patent: Jul. 22, 2025

(54) METHOD FOR DETECTING THE PRESENCE OF WATER

(71) Applicant: Marko Taferner, Wölfnitz (AT)

(72) Inventor: Marko Taferner, Wölfnitz (AT)

( * ) Notice: Subject to any disclaimer, the term of this patent is extended or adjusted under 35 U.S.C. 154(b) by 200 days.

(21) Appl. No.: 17/879,619

(22) Filed: Aug. 2, 2022

(65) Prior Publication Data

US 2023/0039308 A1 Feb. 9, 2023

(30) Foreign Application Priority Data

Aug. 3, 2021 (AT) .............. A 50631/2021

(51) Int. Cl.
*G01M 3/16* (2006.01)
*G01M 3/18* (2006.01)
*G01M 3/40* (2006.01)

(52) U.S. Cl.
CPC .............. *G01M 3/18* (2013.01); *G01M 3/40* (2013.01)

(58) Field of Classification Search
CPC ............ G01M 3/00; G01M 3/16; G01M 3/18; G01M 3/40
See application file for complete search history.

(56) References Cited

U.S. PATENT DOCUMENTS

| | | | |
|---|---|---|---|
| 5,081,422 A | 1/1992 | Shih | |
| 6,301,954 B1 * | 10/2001 | Schuberth | G01M 3/40 73/40 |
| 7,141,982 B2 * | 11/2006 | Fink | G01M 3/40 324/693 |
| 8,319,508 B2 * | 11/2012 | Vokey | C23F 13/02 324/693 |
| 9,695,593 B2 * | 7/2017 | Vokey | G01N 27/048 |
| 9,933,329 B2 * | 4/2018 | Hansen | G01M 5/0025 |
| 2009/0044595 A1 | 2/2009 | Vokey | |

(Continued)

FOREIGN PATENT DOCUMENTS

| | | | | |
|---|---|---|---|---|
| EP | 1052491 A1 * | 11/2000 | | G01M 3/16 |
| EP | 1099946 A1 * | 5/2001 | | B65D 90/508 |
| EP | 2 339 314 A1 | 6/2011 | | |

(Continued)

OTHER PUBLICATIONS

Machine Translation of EP-10524491-A1 (Year: 2000).*

(Continued)

*Primary Examiner* — Nguyen Q. Ha
(74) *Attorney, Agent, or Firm* — NIXON & VANDERHYE

(57) ABSTRACT

In a method for detecting the presence of water or additional water, which exists because of a leak, the following steps are carried out: attaching at least one pair of electrodes to/in an object, to/in the presence of water is to be determined; applying an electrical voltage between the electrodes; testing whether electrical current or electrical current that is increased relative to a basic current flows between the electrodes; and detecting the presence of water in the case of flowing current. When implementing the method, at least two electrodes are used, wherein one electrode can be a ground. The electrodes are arranged separated from one another. DC or AC voltage is applied to the electrodes by a device. The device detects a measured value corresponding to the intensity of the current flowing between the electrodes.

1 Claim, 12 Drawing Sheets

(56) References Cited

U.S. PATENT DOCUMENTS

2013/0218485 A1* 8/2013 Hansen .................. G01N 27/60
　　　　　　　　　　　　　　　　　　　　　　702/38

FOREIGN PATENT DOCUMENTS

| JP | H3-125939 | 5/1991 | | |
| JP | 2018205165 A | * 12/2018 | .............. | G01M 3/02 |
| SE | 1651261 A1 | 1/2018 | | |
| WO | 2009/023956 | 2/2009 | | |
| WO | 2017/011871 | 1/2017 | | |

OTHER PUBLICATIONS

Machine Translation of EP-1099946-A1 (Year: 2001).*
Machine Translation of JP-2018205165-A (Year: 2018).*
Search Report issued in European Patent Application No. 22 18 7573 dated Dec. 16, 2022.
Austrian Search Report dated Apr. 25, 2022, for AT A 50631/2021, 1 pp.

* cited by examiner

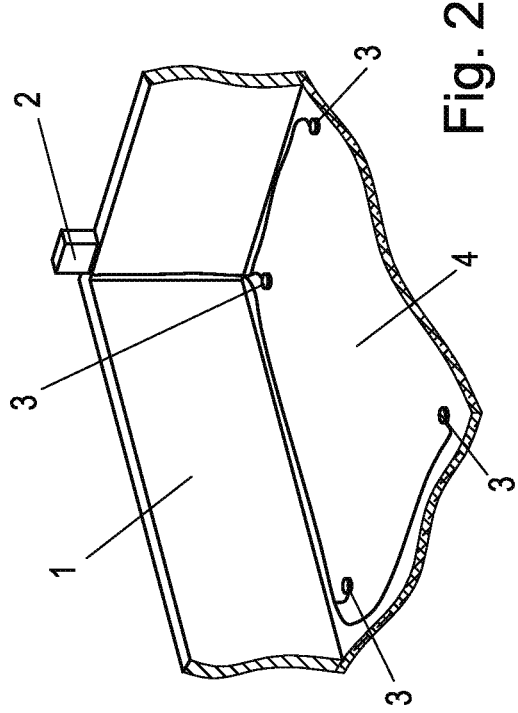
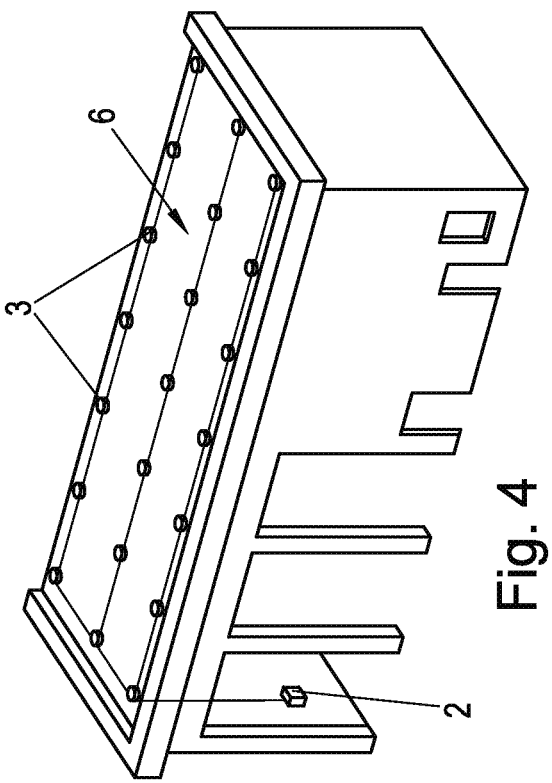
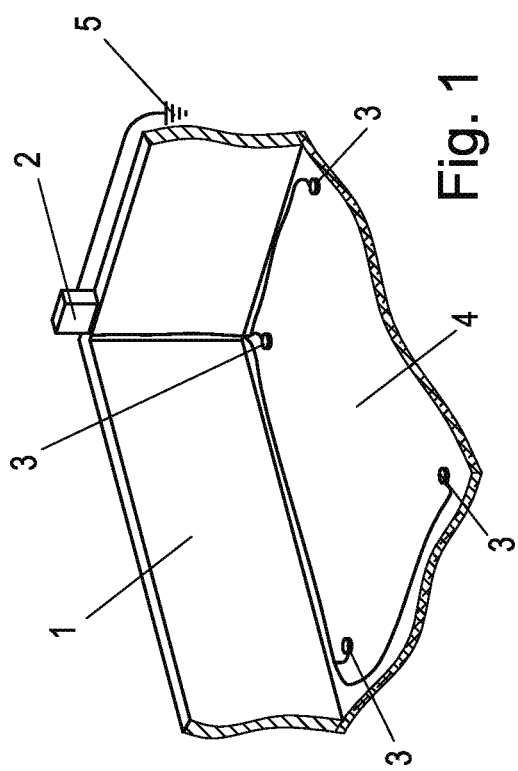
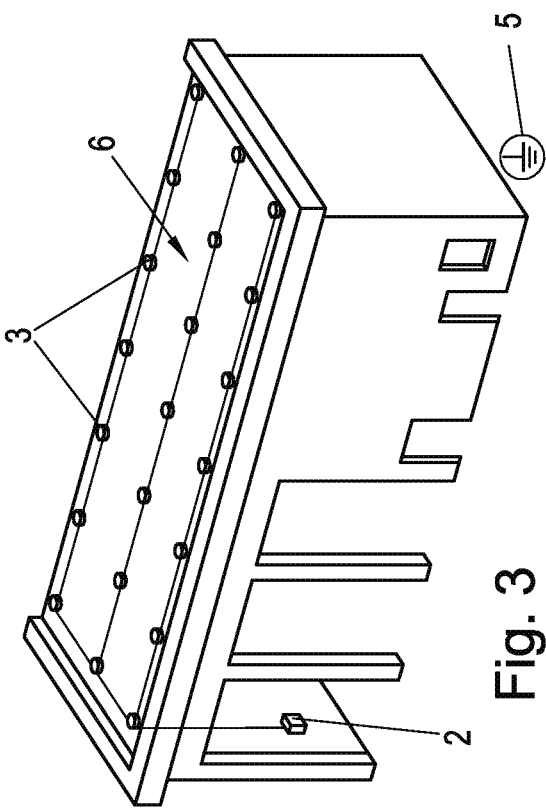

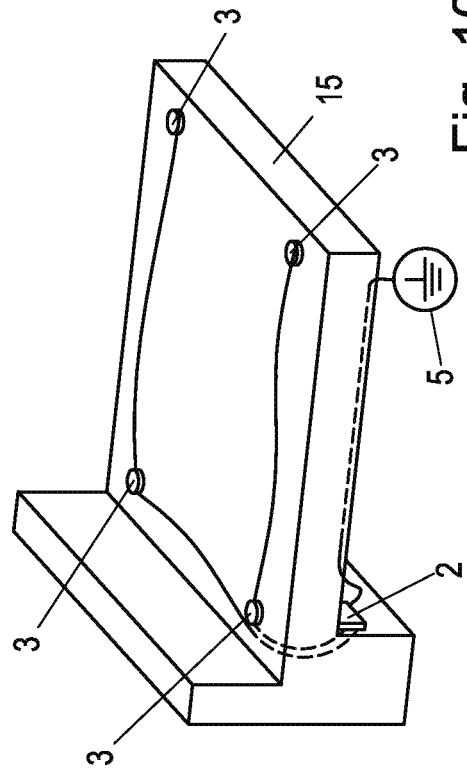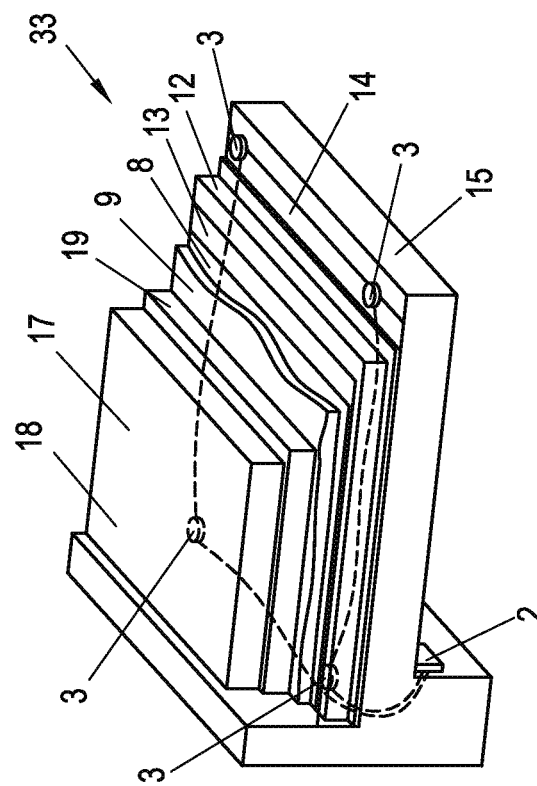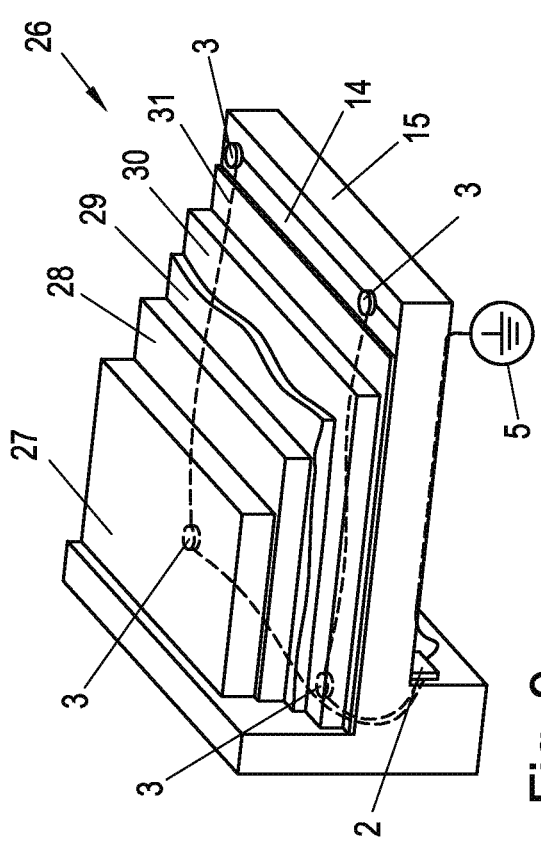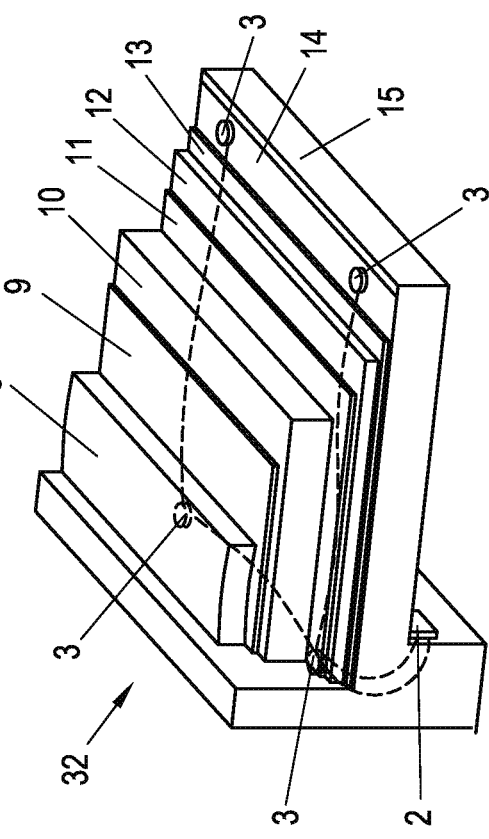

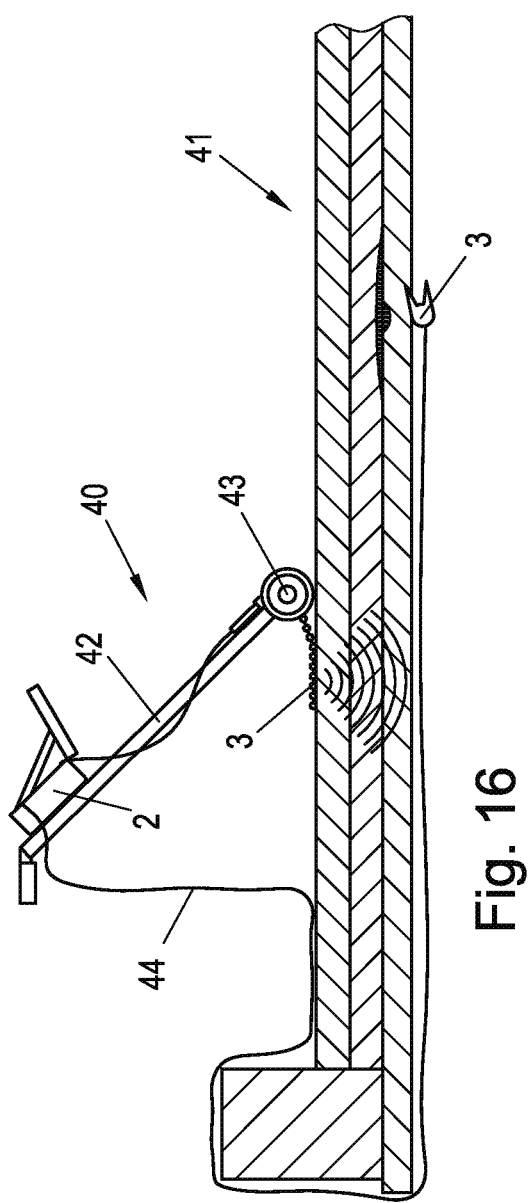
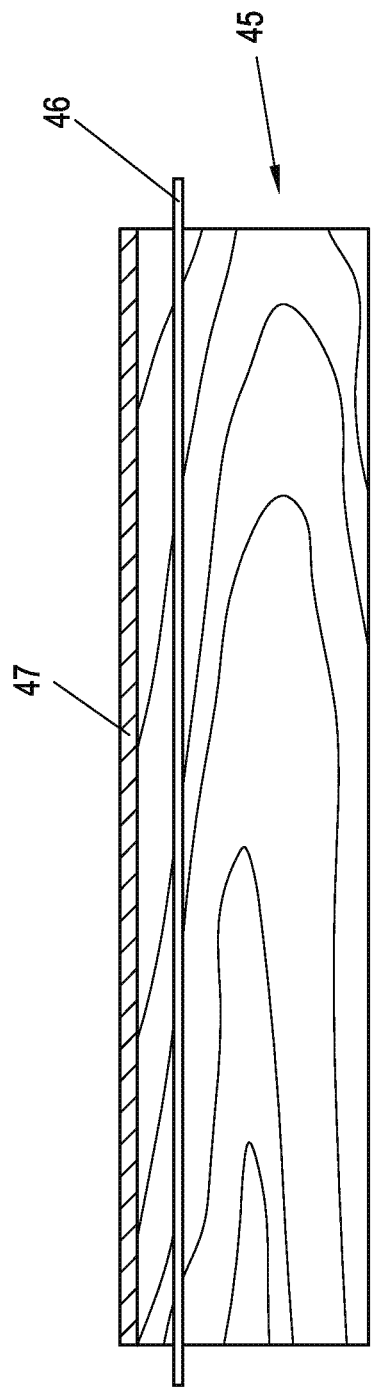
Fig. 16
Fig. 17

METHOD FOR DETECTING THE PRESENCE OF WATER

CROSS-REFERENCE TO RELATED APPLICATIONS

This application claims priority to AT A 50631/2021 filed Aug. 3, 2021, the entire contents of which are hereby incorporated by reference.

BACKGROUND OF THE INVENTION

Field of the Invention

The invention relates to a method for detecting the presence of water.

The undesirable presence of water can occur in the arena of liquid-filled pipes, such as, for example, in lines in waste-water, drinking-water, and heating systems. In addition, the undesirable presence of water can occur in the arena of swimming pools (indoor and outdoor pools), swimming ponds, underground containers, shafts, oil traps, and sewage treatment plants, etc.

Also, the undesirable presence of water can occur in the residential arena, so that it is necessary to monitor household installations, water and waste-water lines, heating systems, basement areas, flat roofs, and composite lumber. It is advantageous when in the case of household installations, any leaks that cause the undesirable presence of water can be located.

Finally, it is important to monitor retaining walls in the case of dams in order to detect undesirable losses of water and to be able to provide corrective actions.

Description of the Related Art

Methods and arrangements for detecting water are known.

In the case of WO 2009/023956 A1, leak sites in a film ("membrane") of a roof are to be detected. On the film of the horizontal roof, blank electrical conductors are installed in a lattice pattern with insulated crossing points. Voltage is applied between the substructure of the roof and the conductors. Relays from conductor to conductor are used to test whether current flows. When current flows at one site, the other conductors are grounded.

According to WO 2017/011871 A1, leaks in a liquid-conveying line are to be detected. A sensor that emits electrical signals that are different from one another is moved in the line. An electrode is arranged on the outside of the line. The electrode can receive signals from the sensor. A processor processes the signals of the sensor with positional data of the sensor in order to locate a detected leak. A leak is located when the signals emitted by the sensor are received by the electrode with identical intensity.

In order to detect and locate a leak, electrodes in the form of electrical conductors are arranged parallel to one another according to JP H03-125939 A. One of the conductors is connected to (+). The other conductor is grounded. The (+)-connected conductor is guided through an insulating pipe and connected to (+) behind the pipe. Current flows between the conductors at a leak site. In order to locate a leak site, one end of a conductor is moved.

In the case of U.S. Pat. No. 5,081,422 A, two conductors parallel to one another are arranged in a netlike manner for detecting and locating leak sites in roofs or basement walls. Voltage is applied to the conductor. By scanning current caused by a leak site, the leak site is located.

SUMMARY OF THE INVENTION

The object of the invention is to make available a method of the above-mentioned type with which the (undesirable) presence of water (moisture) at or in any objects can be detected.

The method according to the invention allows the (undesirable) presence of water to be detected inside and outside of an object, wherein it is also possible to locate and qualify leak sites, so that leaks and drip losses can be detected. Even in the case of oil trap basins, underground containers, shafts, filter beds, etc., a leak test can thus also be performed.

The method according to the invention can be applied for monitoring as well as for locating and qualifying increased moisture in or on structures, leaks, and/or leak sites.

In an exemplary application, when the method according to the invention is implemented, the procedure can be carried out in such a way that the pipe wall of a pipe serves as an insulating layer between the interior of the pipe and the surrounding soil, so that the exit of water through leak sites or through other leaks can be detected using the method according to the invention. Something analogous also applies for films of swimming ponds, flat roofs (tarred-board, tin, or tiled roofs), so that the method according to the invention can be advantageously applied even here.

In these applications, measurement of the electrical current between two electrodes on which electrical voltage is applied is performed by the method according to the invention. It is thus possible to detect conductivity (electrolyte) that is produced or increased by the presence of water and electrical current that flows because of the applied voltage or current that flows with increased current intensity relative to a flowing (basic) current.

When pipes are to be monitored in order to detect the presence of undesirable water that exits from the pipe, an electrode can be drawn through the pipe. In this case, it is preferred that a measuring sensor be used as an electrode, which sensor has a (measuring) electrode that is concentric to the measuring sensor and is arranged around the latter. In this case, a ground acts as a counter electrode. When, in this application of the method, a (water-induced) conductive connection is present between the pipe interior and the surrounding area of the pipe, current flows, thereby causing a rise in the measuring signal (flowing current). This change can be pinpointed and identified as a leak (leak or damaged spot) in the pipe.

With the application of the method according to the invention at/in buildings or flat roofs as well as retaining walls, measurement is done between at least two electrodes. If, in the case of applied measuring voltage, the measured value (current) increases in the case of leaks or the presence of water, a leak is identifiable—when two electrode pairs are used—and can be located.

In another application of the method according to the invention, more than two electrode pairs are used, so that a cross-measurement can take place between various pairs of electrodes and a locating of the site where water is present can be carried out.

With the method according to the invention, the procedure can be carried out with d.c. voltage or a.c. voltage, i.e., electrical d.c. voltage or electrical a.c. voltage can be applied on the at least one pair of electrodes by the measuring unit, so that d.c. current or a.c. current flows when water is present.

When the method according to the invention is implemented, a measuring device can be used that automatically transfers basic voltages from a (saved) database, wherein the basic voltages usually lie in the millivolt range. As an alternative, it is possible to measure up to 700 Hz to set the basic voltage used to the optimal conductivity of the object on which water is to be detected, so that a successful measurement can take place.

In one embodiment, with the invention, a database with various conductivities is saved, wherein, however, it is also possible, in special applications, to perform a calibration for the conductivity between two defined electrode pairs at a defined distance and defined measuring voltage.

The thus determined data of the conductivity are saved and stored for each measuring section.

The method according to the invention can be applied in various arenas, e.g., in building installations, indoor and outdoor pools, swimming ponds, building superstructures, flat roofs, building parts, basements, slabs, concrete pavement-composite lumber-prefabricated houses, etc.

The (basic) conductivity of the materials in which testing for the presence of (undesirable) water is done is taken into consideration when the method according to the invention is implemented.

When the method according to the invention is implemented, the electrode and the counter electrode can be arranged in a different way, wherein the counter electrode can also be designed as a ground.

In a variant of the method according to the invention, the procedure is carried out with an electrode (ground sensor) that is designed as a ground, which is advantageous, for example, in the case of pipes in the soil, in the case of buildings (house installations, flat roofs, swimming pools, swimming ponds, etc.). It is preferred to fasten the ground sensor in the soil or in/on a concrete pavement or road bridge in the case of flat roofs or buildings.

As an alternative, the method according to the invention can be applied to water-filled pipes. With this exemplary embodiment, two electrodes are pulled through the interior of the pipe. Because of the length of the cable to which the electrodes are connected, leaks (leak sites) can be located in the water-filled pipe. The positions of the two electrodes arranged inside the pipe, which positions are known from the cable lengths, can be used to determine where a leak is located.

The method according to the invention can also be used for locating leaks in house installations, underfloor heating systems, and general water lines. With the application of the method according to the invention to water-filled lines, a ground sensor can be installed with a pressure screwing in the line that is to be examined. Thus, an electrical contact with the medium is created.

In the case of buildings or flat roofs or inside a pipe, measurement can be done with the invention between individual pairs of electrodes. Also, a manual sensor on the floor or walls can be used to determine precisely whether a leak or increased moisture is present, for example in composite lumber or in prefabricated houses.

In the case of fixed installations, when increased moisture (undesirable presence of water) is detected, an exact location of the position of moisture or a leak can be carried out if more than one electrode pair is installed and a cross-measurement is performed.

With the method according to the invention, relative measured values and absolute measured values can be depicted or compared. The measured values are values that the current intensity of the electrical current that flows between measuring sensors (=electrodes) because of the voltage that is applied to the electrodes.

When the procedure is carried out with the absolute measured values in the method according to the invention, these measured values relate to the current intensity based on the occurrence of water on/in the tested object. In this case, an upper limit can be set depending on the respective material. When the measured value, i.e., the current intensity, exceeds the upper limit, it is assumed that (undesirable) water has been detected on/in the object, for example water that has exited from a leaky spot (leak site).

In the case of relative measured values, for example, a highest measured value is applied, wherein when reaching the highest measured value, it is decided whether a leak site that induces the presence of water is present. When carrying out the method according to the invention with relative measured values, the temperature and humidity when carrying out the method according to the invention do not play any role. With the variant of the method according to the invention—in which the procedure is carried out with relative measured values, a measured value that is elevated relative to, for example, the measured value (=current intensity) due to current that is flowing per se ("countercurrent") induced by the presence of undesirable additional water, originating from, e.g., a leak site—current with an elevated current intensity can be used to detect a leak site/undesirable water.

BRIEF DESCRIPTION OF THE DRAWINGS

Additional details and features of the method according to the invention follow from the description below of examples depicted in the drawings. Here:

FIG. 1 shows the application of the method according to the invention in the case of a swimming pool with a ground, FIG. 2 shows the application of the method according to the invention in the case of a swimming pool without a ground, FIG. 3 shows the application of the method according to the invention to a flat roof with a ground, FIG. 4 shows the application of the method according to the invention to a flat roof without a ground, FIGS. 5 to 15 show practical examples of the method according to the invention on various flat roofs, FIG. 16 shows a practical example in locating a leak in a flat roof, FIG. 17 shows the application of the method according to the invention to a composite lumber.

DESCRIPTION OF THE PREFERRED EMBODIMENTS

Figure 5:
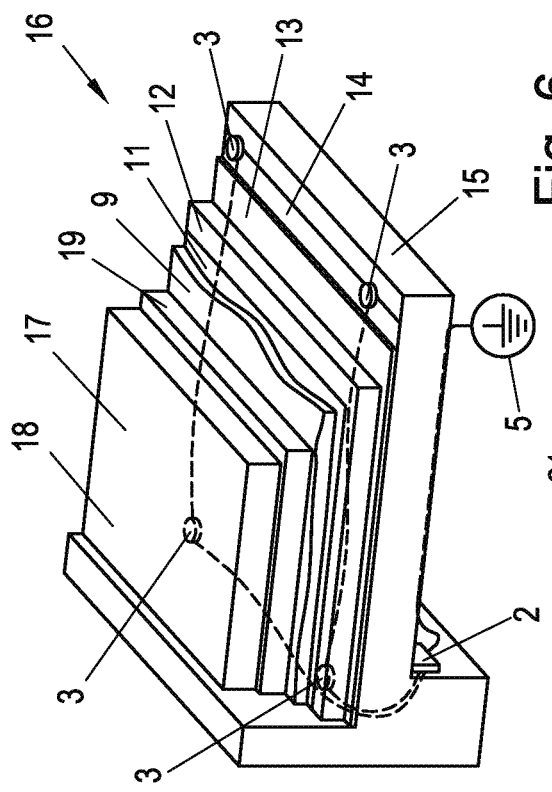

In the example, shown in FIG. 1, for implementing the method according to the invention on a swimming pool, the basin 1 of the pool acts as an insulating layer relative to the surrounding soil. On the edge of the basin 1 of the swimming pool, a measuring unit 2 is arranged, to which in the embodiment shown are connected four electrodes 3, which are arranged in the swimming pool lying on its bottom 4. In addition, the measuring unit 2 is connected to a ground 5 as a counter electrode.

When implementing the method according to the invention, voltage is applied by the measuring unit 2 between each of the four electrodes 3, which are attached to the bottom 4 of the swimming pool, and the ground 5. When current flows between at least one of the four electrodes 3 and the ground 5 that is used as a counter electrode, it can be assumed that a leaky spot exists in the area of the at least one of the current-conducting electrodes 3, since an (electrolytically)-conductive connection is provided between the current-conducting electrode or electrodes 3 and the ground 5 by water that exits from the swimming pool. The method thereby detects that water has leaked from the pool into the ground.

FIG. 2 shows the arrangement of FIG. 1, but without a ground 5.

In the arrangement shown in FIG. 2, which operates without a ground 5, voltage from the measuring unit 2 is applied to respectively two of the four electrodes 3, so that current flows between the electrodes 3 when moisture is present.

FIG. 3 shows in diagrammatic form on a flat roof 6 the arrangement of a measuring unit 2 and multiple electrodes 3 as well as a ground 5 as a counter electrode.

In the embodiment shown in FIG. 3, multiple electrodes 3, arranged on the flat roof 6, are connected to the measuring unit 2. In addition, a ground 5 is connected to the measuring unit 2. Electrical voltage is applied by the measuring unit 2 between the electrodes 3 and the ground 5, so that when current flows, it can be detected whether and where a leaky spot exists in the flat roof 6 because of the presence of water leaking from the roof 6 and forming an electrically conductive path between the roof and the ground.

FIG. 4 shows the design that is similar to FIG. 3, but without a ground 5.

In the case of the application according to the invention of the method according to the invention in accordance with FIG. 4, the procedure is carried out similarly to the application shown in FIG. 3, wherein, however, the procedure is carried out without a ground 5, wherein electrical voltage is applied between two electrodes 3—the latter then form an electrode pair.

In the application of the method according to the invention for detecting the presence of water in the area of the flat roofs 6, it must be assumed that the concrete pavement acts as vapor/water barrier between the interior of the roof and the ceiling under it. In this case, the conductivity between two pairs of electrodes 3 or more than two pairs of electrodes 3 is measured. When more than two pairs of electrodes 3 are applied, a cross-measurement can be performed, so that the position of a leaky spot in the flat roof 6 can be determined (located).

FIG. 5 shows the application of the method according to the invention on a ventilated flat roof 7 with a ground 5, wherein the design of the roof from top to bottom is as follows:
Seal 8
Separating layer 9
Planking 10
Separating layer (diffusion furnace) 11
Insulation 12
Moisture barrier 13
Bitumen layer 14
Electrodes 3
Base/Roof structure 15
Ground 5 (depicted as a cable).

Figure 6:
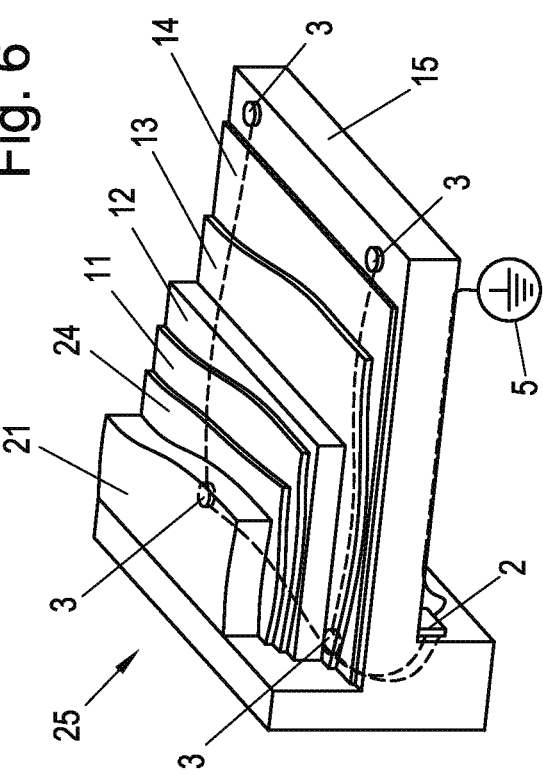

FIG. 6 shows the application of the method according to the invention to a planted-green roof 16 with a ground, wherein the design of the roof from top to bottom is as follows:
Vegetation layer 17 and green planting 18
Draining layer, system filters, & root-blocking non-woven sheet 19
Separating/Sliding layer 9
Roof sealing
Separating layer 11
Insulation 12
Moisture barrier 13
Bitumen layer 14
Electrodes 3
Base/Roof structure 15
Ground 5 (depicted as a cable).

Figure 7:
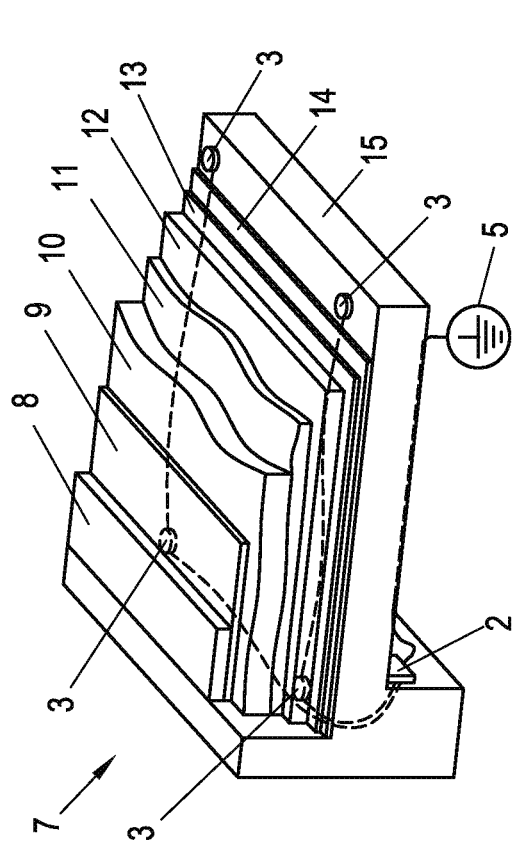

FIG. 7 shows the application of the method according to the invention to an inverted roof 20 (unventilated) with a ground, wherein the design of the roof from top to bottom is as follows:
Gravel fill 21
Roof non-woven sheet 22
Hard-foam plates 23
Roof sealing 24
Bitumen layer 14
Electrodes 3
Base/Roof structure 15
Ground 5 (depicted as a cable).

Figure 8:
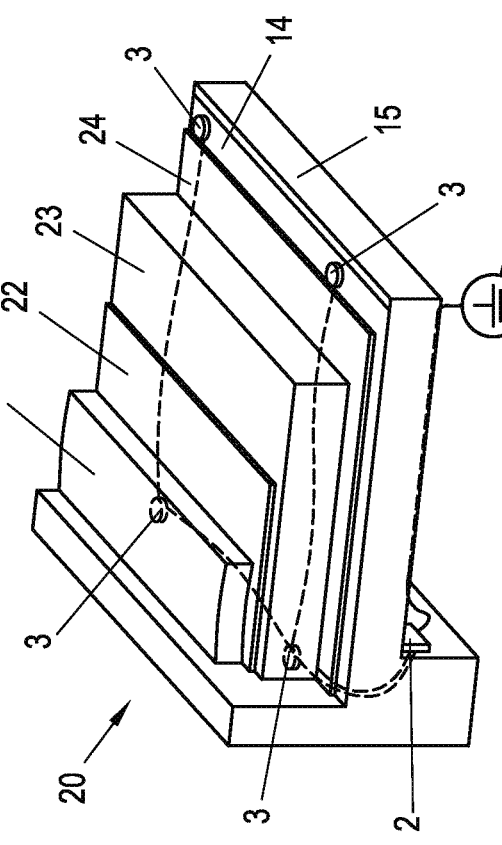

FIG. 8 shows the application of the method according to the invention to a warm roof 25 (unventilated) with a ground, wherein the design of the roof from top to bottom is as follows:
Gravel fill 21
Seal 24
Separating layer 11
Thermal insulation 12
Moisture barrier 13
Bitumen layer 14
Electrodes 3
Base/Roof structure 15
Ground 5 (depicted as a cable).

FIG. 9 shows the application of the method according to the invention to a grounded roof 26 that can support vehicles, wherein the design of the roof from top to bottom is as follows:
Concrete slabs/Asphalt 27
Ballast substructure 28
Bearing layer 29
Draining and protective layer 19
Separating and sliding layer 9

Top ply 30
Sealing layer 31
Bitumen layer 14
Electrodes 3
Base/Roof structure 15
Ground 5 (depicted as a cable).

FIG. 10 shows the application of the method according to the invention to a flat roof 6, wherein on the top of the flat roof 6, four electrodes 3 that are connected in each case to the measuring unit 2 are provided. In addition, a ground 5 is provided, which is also connected to the measuring unit 2.

FIG. 11 shows the application of the method according to the invention to a ventilated cold roof 32 without a ground 5, wherein the design of the roof 32 from top to bottom is as follows:
Seal 8
Separating layer 9
Planking 10
Separating layer (diffusion furnace) 11
Insulation 12
Moisture barrier 13
Bitumen layer 14
Electrodes 3
Base/Roof structure 15.

FIG. 12 shows the application of the method according to the invention to a planted-green roof 33 without a ground 5, wherein the design of the roof 33 from top to bottom is as follows:
Vegetation layer 17 and green planting 18
Draining layer, system filters, & root-blocking non-woven sheet 19
Separating/Sliding layer 9
Roof sealing 8
Separating layer 11
Insulation 12
Moisture barrier 13
Bitumen layer 14
Electrodes 3
Base/Roof structure 15.

Figure 13:
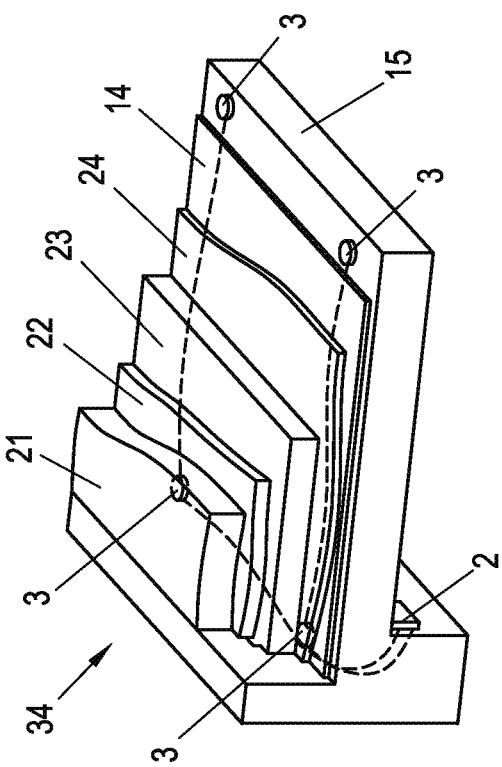

FIG. 13 shows the application of the method according to the invention to an inverted roof 34 (unventilated) without a ground, wherein the design of the roof 34 from top to bottom is as follows:
Gravel fill 21
Roof non-woven sheet 22
Hard-foam plates 23
Roof sealing 24
Bitumen layer 14
Electrodes 3
Base/Roof structure 15.

Figure 14:
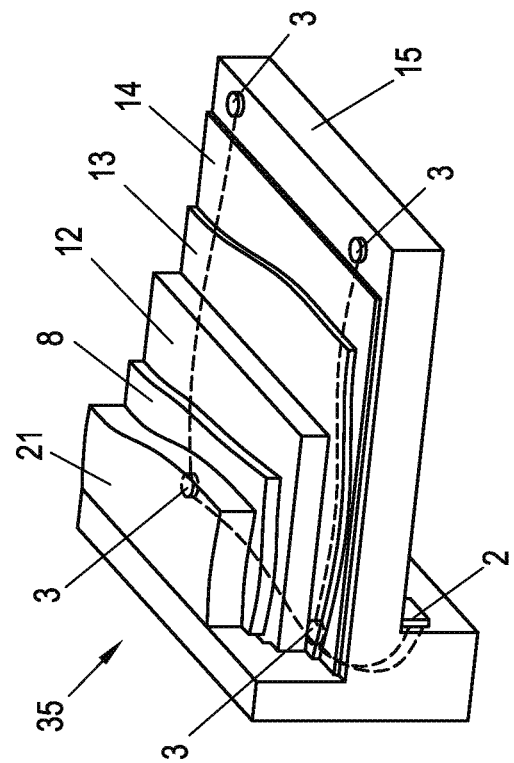

FIG. 14 shows the application of the method according to the invention to a warm roof 35 (unventilated) without a ground, wherein the design of the roof 35 from top to bottom is as follows:
Gravel fill 21
Seal 8
Separating layer 9
Thermal insulation 12
Moisture barrier 13
Bitumen layer 14
Electrodes 3
Base/Roof structure 15.

Figure 15:
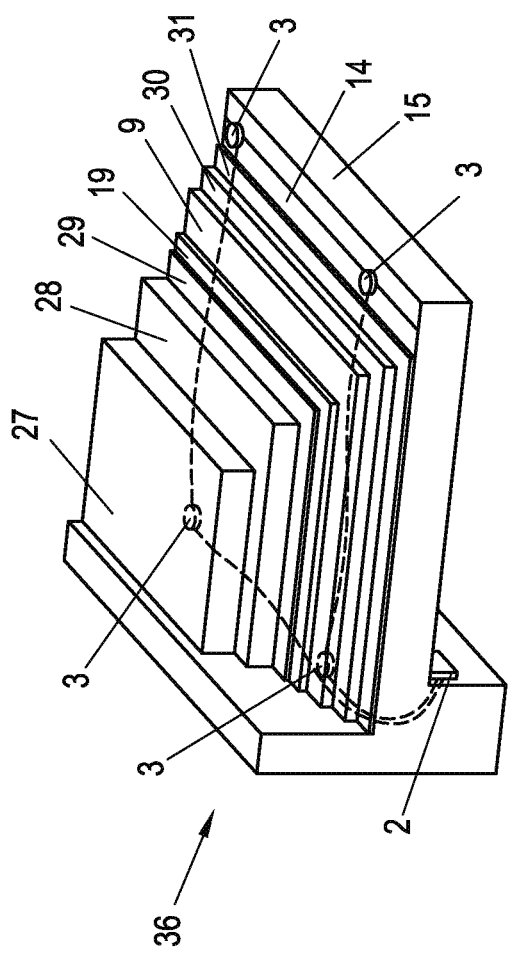

FIG. 15 shows the application of the method according to the invention to a roof 36 that can support vehicles without a ground, wherein the design of the roof 36 from top to bottom is as follows:
Concrete slabs/Asphalt 27
Ballast substructure 28
Bearing layer 29
Draining and protective layer 19
Separating and sliding layer 9
Top ply 30
Sealing layer 31
Bitumen layer 14
Electrodes 3
Base/Roof structure 15.

FIG. 16 shows in diagrammatic form the application of a mobile measuring device 40, equipped with an electrode 3, for locating leaks on a flat roof 41. The electrode 3 is mounted on a frame 42 with wheels 43 and slides over the top of the flat roof 41, wherein the measuring unit 2 that supplies the voltage is mounted on the frame 42. A line 44 runs from the measuring unit 2 that is mounted on the frame 42 to the counter electrode 3 that is attached below the roof. In the case of undesirable moisture (indicated on the right in FIG. 16), the leaky spot is determined from a rise in current intensity (because of increased conductivity).

FIG. 17 shows the application of the method according to the invention in the case of a composite lumber 45. So that the method according to the invention can be carried out, an electrically-conductive measuring wire 46 (steel wire) is integrated into the composite lumber 45. An electrically-conductive strip 47 (steel strip) is fastened (glued or screwed) onto the top of the composite lumber 45. Electrical voltage is applied by the measuring unit 2 that is connected to the steel strip 47 and the measuring wire 46 to detect water (moisture) in the composite lumber 45. As soon as current flows and its current intensity is shown on the measuring unit 2 as a measured value, it can be inferred that water is present in the composite lumber 45.

Figure 18:
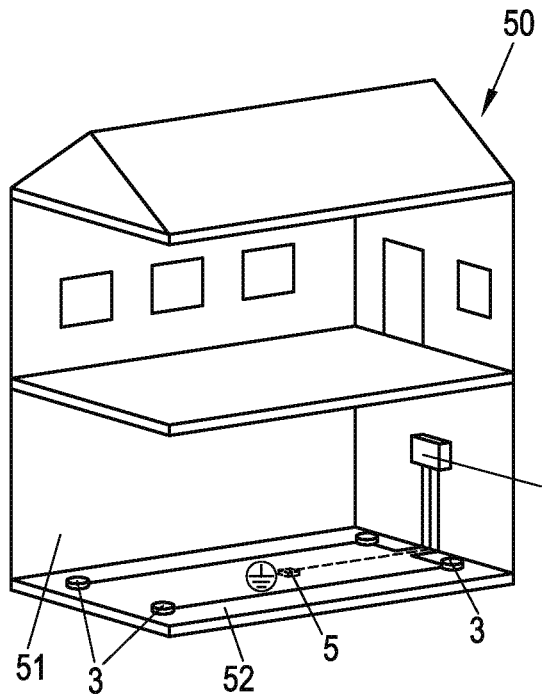
FIG. 18 shows the application of the method according to the invention to a prefabricated house (only in the basement or slab)

FIG. 18 shows the application of a method according to the invention in the area of a basement 51 of a prefabricated house 50, wherein in the example, multiple electrodes 3 are arranged on the slab 52, and a ground 5 is attached below the slab 52. Both the electrodes 3 and the ground 5 are connected to the measuring unit 2, so that voltage can be applied by the latter between the electrodes 3 and the ground 5. In the presence of (undesirable) water, current flows between the electrodes 3 and the ground 5, so that because of the flowing current, whose intensity is shown as a measured value on the measuring unit 2, it can be inferred that water is present.

Figure 19:
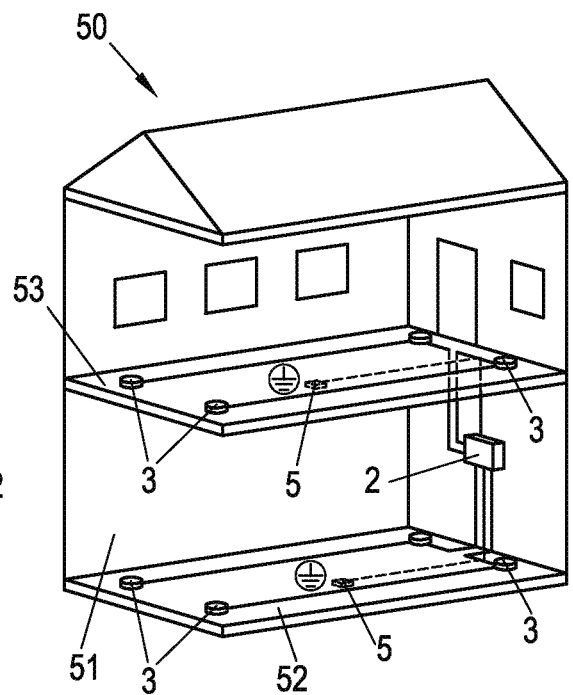
FIG. 19 shows the application of the method according to the invention to a prefabricated house with a ground.

FIG. 19 shows an expansion of the embodiment that is shown in FIG. 18, wherein testing for the presence of water is done not only in the basement 51, but in the entire house 50 in the area of a drop ceiling 53.

Figure 20:
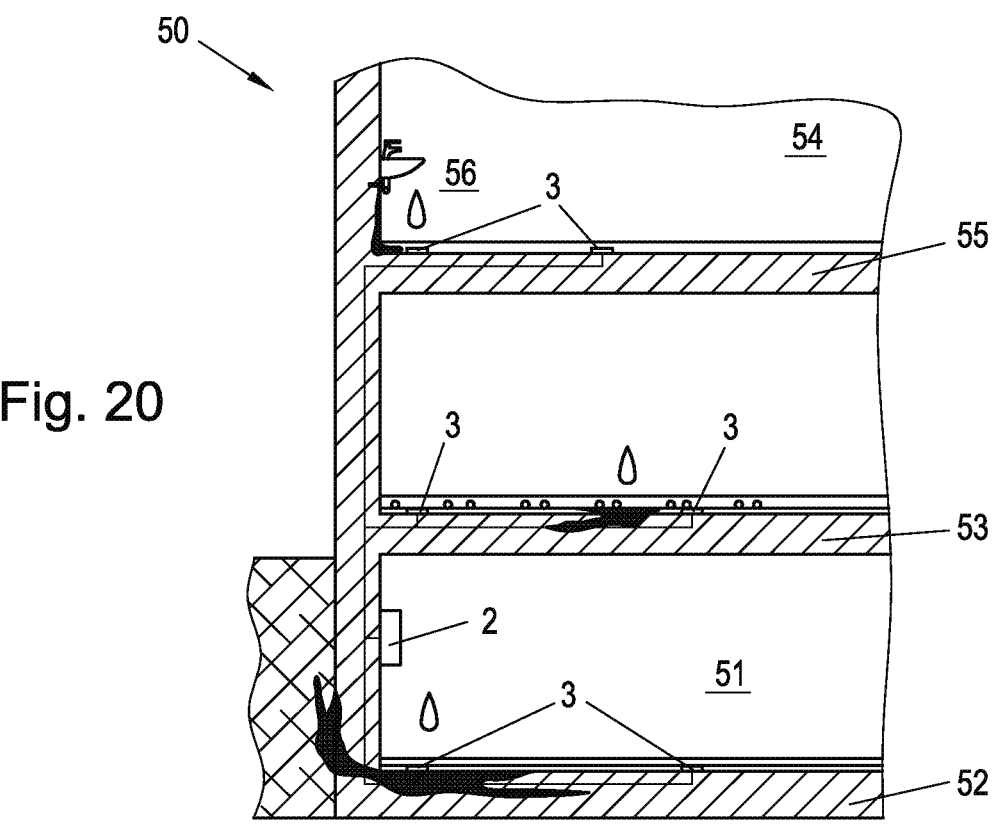
FIG. 20 shows the application of the method according to the invention in the case of a building installation.

In FIG. 20, the design, shown in FIG. 19, for the application of the method according to the invention is depicted in diagrammatic form for the entire house 50. Two electrodes 3 are arranged on the slab 52 of the basement floor. Two additional electrodes 3 are arranged in the area of the drop ceiling 53. Finally, two additional electrodes 3 are arranged in the area of the roof 54 and in another ceiling 55. All of these electrodes 3 are connected to the measuring unit 2, wherein the presence of water that can be detected using the method according to the invention is depicted symbolically by the depiction of "drops" in the area of the basement 51, in the area of the basement ceiling (=drop ceiling 54), and in the area of a bathroom 56.

Figure 21:
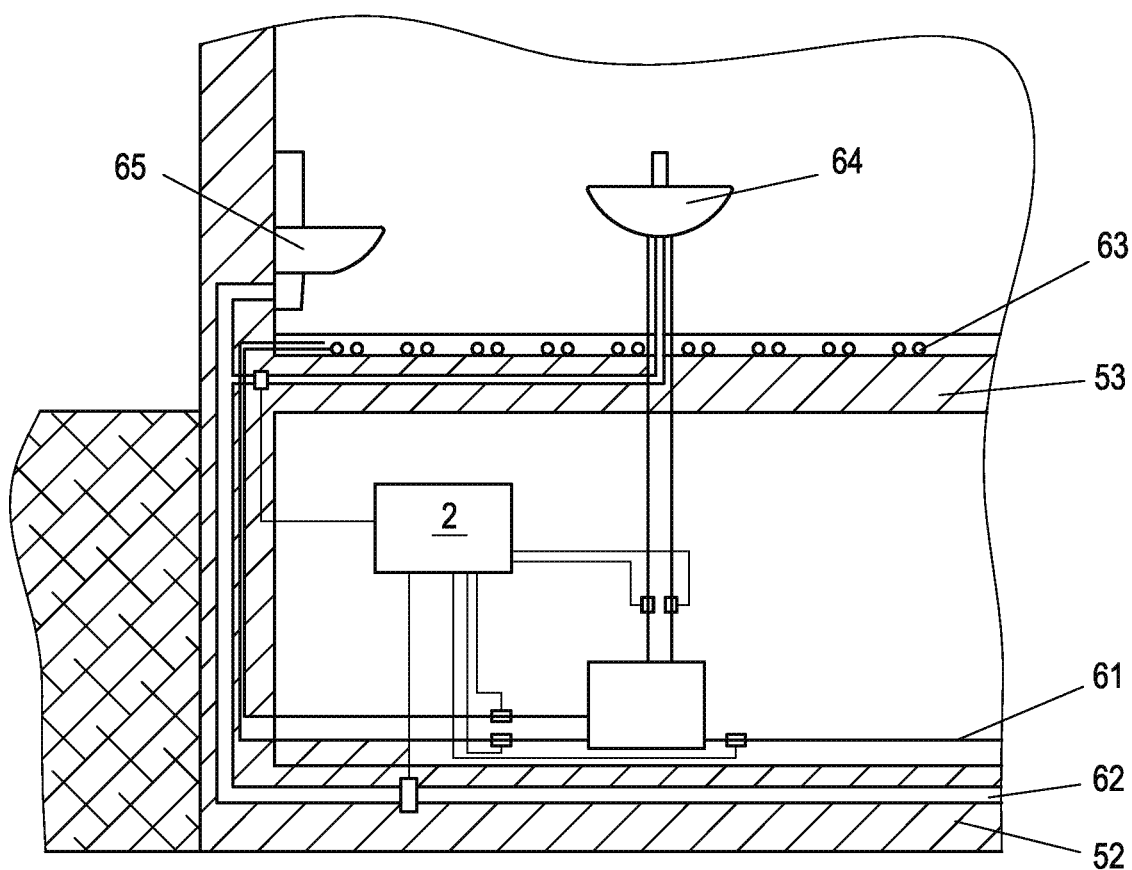
FIG. 21 shows the application of the method according to the invention in the case of a different building installation.
Figure 22:
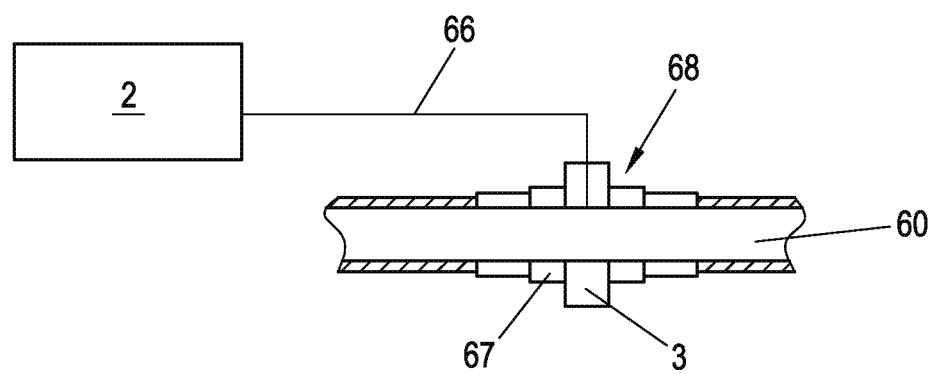
FIG. 22 shows the application of the method according to the invention in the case of a line installation.

FIGS. 21 and 22 depict the diagrammatic design of an arrangement for implementing the method according to the invention on pipes 60 in building installations, in order to monitor the latter. It is thus assumed that normally, the floor screed acts as an insulating layer between various electrodes 3 in a ceiling 53 under it and the interior of the room. In this case, fixed sensors in the form of electrodes 3, as is depicted diagrammatically in FIG. 22, are provided. Thus, it is possible to monitor and oversee not only the water feed line 61 and the waste-water line 62, but also an underfloor heating system 63 and/or the supply of hot water or cold water to a wash basin 64 and/or a toilet 65 in order to determine whether water is present outside of the lines and therefore at least one leak site exists.

In FIG. 22, it is shown how the measuring unit 2 is connected via a (an) (electronic) line 66 to an electrode (measuring sensor) 3 that is arranged on the pipe 60. The electrode 3 is fastened to the pipe 60 using an adapter 67, wherein a measuring opening 68 is provided in the area of the electrode 3 in the pipe 60.

Figure 23:
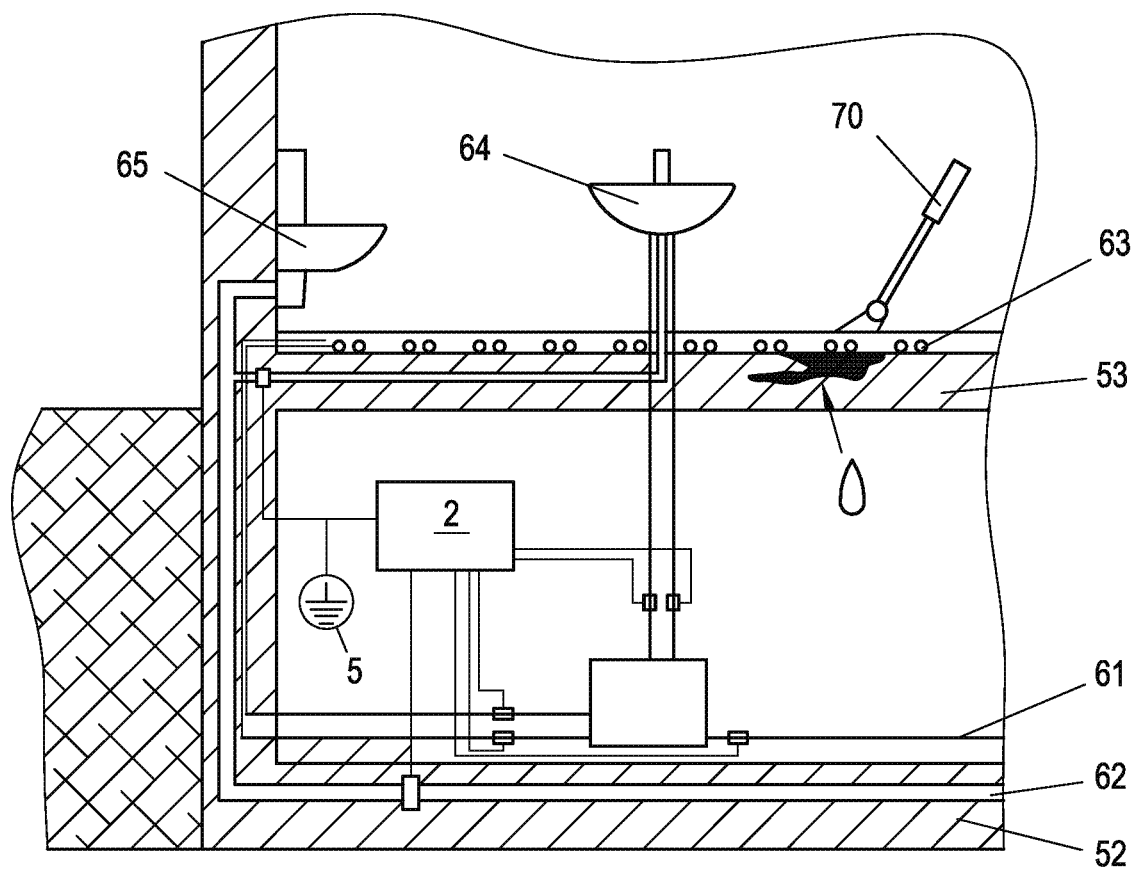
FIG. 23 shows the application of the method according to the invention in locating leaks using a manual sensor with a ground.

In the arrangement, shown in FIG. 23, for implementing the method according to the invention, it is shown how a leak site can be located in an underfloor heating system 63 using a manually-guided sensor 70 (leak-locating sensor as electrode 3). It is thus assumed that the measuring unit 2 is not only grounded but is also—as indicated below in FIG. 23—connected to the waste-water line 62 (for example as shown in FIG. 22).

Figure 24:
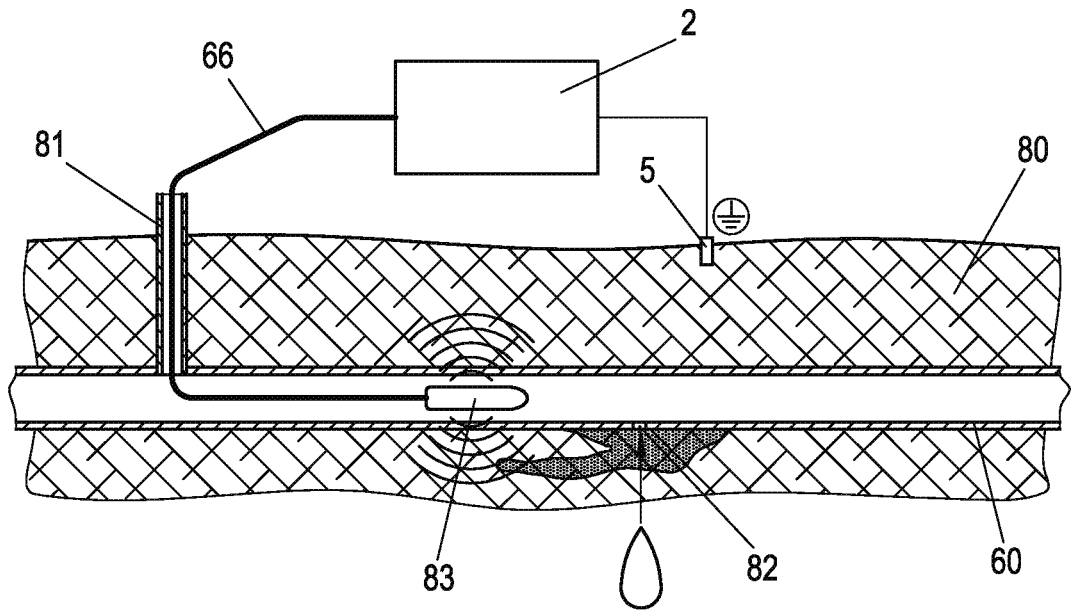
FIG. 24 shows the application of the method according to the invention in locating leaks in a pipe with a ground.

In the embodiment, shown in FIG. 24, of the method according to the invention, a leak site 82 is located in a pipe 60 that is installed in the soil 80. To this end, a line 66 starting from the measuring unit 2, on which line's free end a sensor 83 with electrodes 3 is arranged, is inserted via a (an) (already present) connecting point 81. The measuring unit 2 is also connected to a ground 5 that is designed in the usual way.

By moving the sensor 83 in the pipe 60—this can be done using the line 66 to which the sensor 83 is connected—the sensor 83 is moved through the pipe 60. A leak site 82 can be detected in the pipe 60 based on the electrical current that flows between the electrode 3 in the sensor 83 and the ground 5 because of the increased conductivity induced by the presence of water. Locating the leak site can be done by measuring the length of the line 66 (of the cable) to which the sensor 83 that has the electrode 3 is attached.

Figure 25:
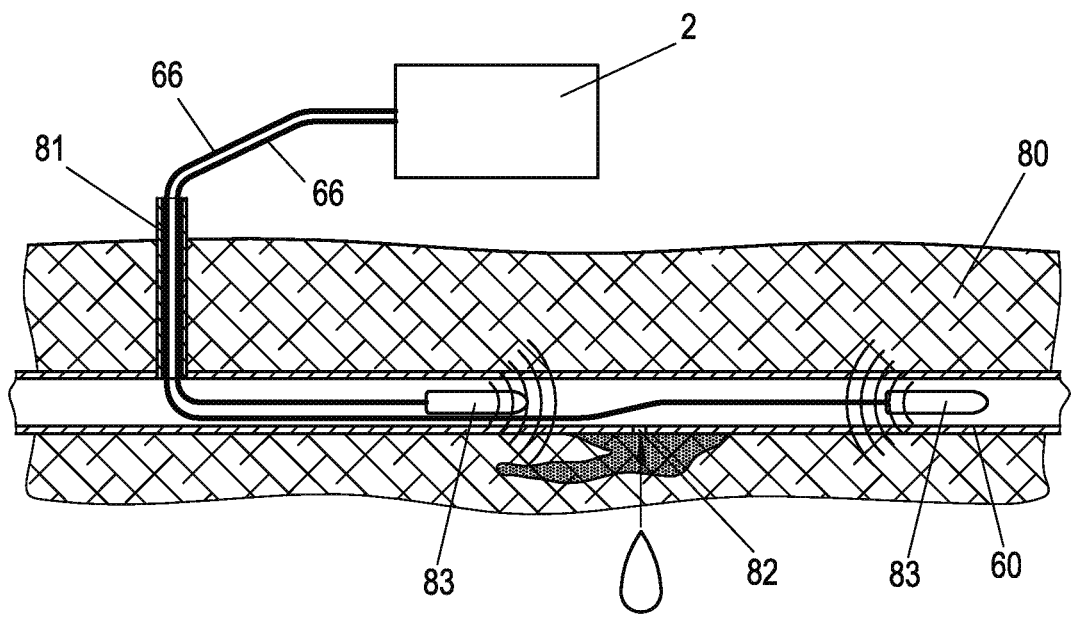
FIG. 25 shows the application of the method according to the invention in locating leaks using a manual sensor without a ground.

In the case of the variant, shown in FIG. 25, of an arrangement for implementing the method according to the invention for locating leak sites 82 in a pipe 60, the procedure is carried out without a ground 5. In this case, two sensors 83 with electrodes 3 are connected via separate lines 66 to the measuring unit 2. When the sensors 83 are located in the area of a leak site 82, as indicated in FIG. 25, electrical current flows between the electrodes 3 accommodated in the sensors 83, which current is increased relative to the current ("basic current") flowing between the electrodes 3 per se because of the presence of water in the pipe 60. The cause of the increase in current intensity (=measured value) in the area of the leak site 82 is the water exiting/exited through the leak site 82 into the soil. Also, in this embodiment, locating the leak site 82 can be done by determining the length of the lines 66 (cable) to which the sensors 83 are connected and which are connected to a measuring unit 2.

In the case of all practical examples of the method according to the invention, it is advantageous, but not necessary, when even the temperature prevailing when water is detected and the humidity are taken into consideration in order to eliminate misinterpretations when the presence of (undesirable) water is detected.

Figure 26:
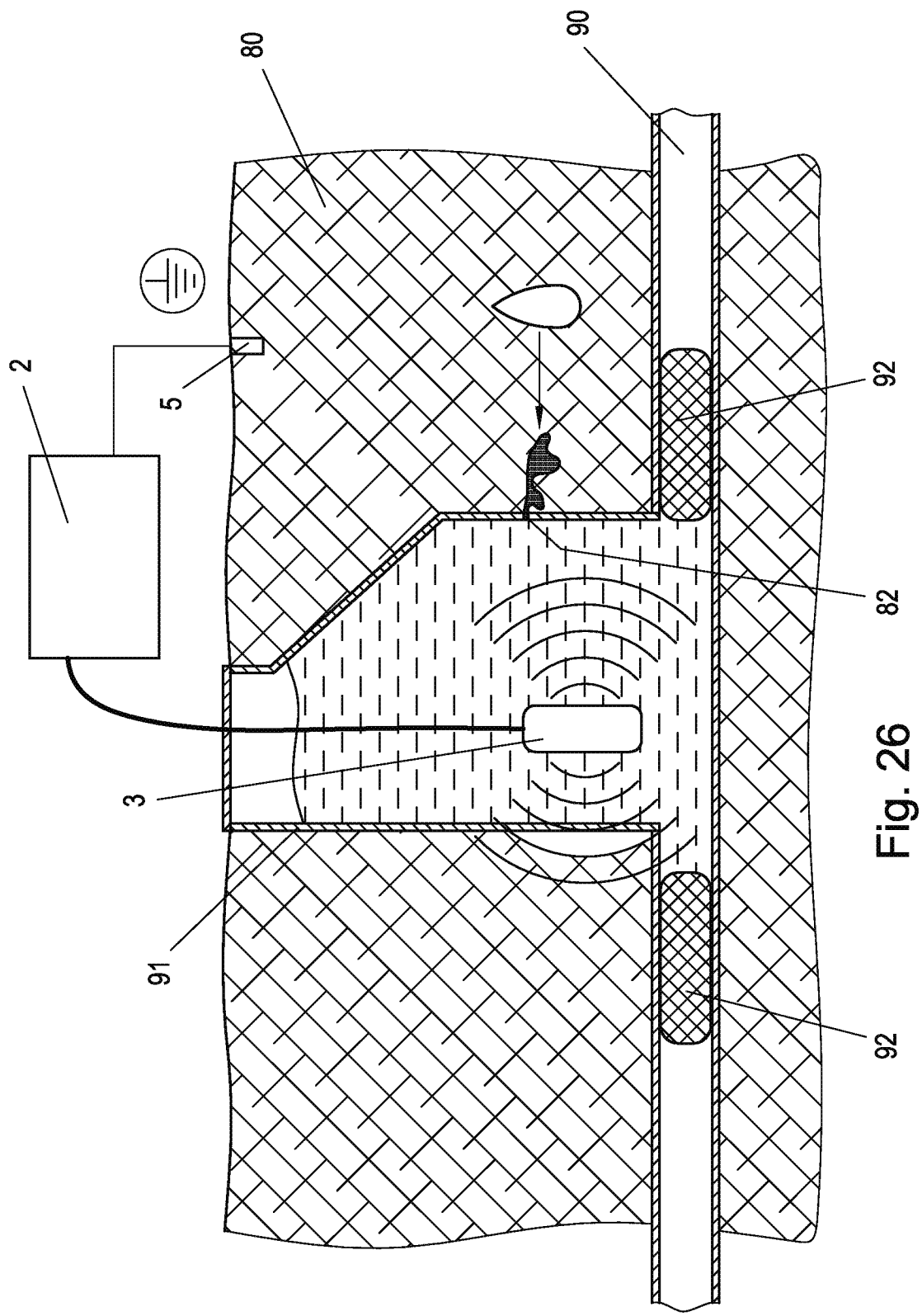
FIG. 26 shows the application of the method according to the invention in locating leaks in sewer shafts with a ground.

FIG. 26 shows a sewer line 90, which is installed in the soil 80 and has a sewer shaft 91. For implementing the method according to the invention, the sewer shaft 91 is sealed relative to the actual sewer line 90 by (two) impermeable cushions 92. The sewer shaft 91 can thus be filled with water. In the example that is shown, water exiting from a leak site 82 in the wall of the sewer shaft 91 can be detected. For this purpose, an electrode 3, which is connected via an electronic line 66 to a measuring unit 2, is inserted into the sewer shaft 91. Also, a counter electrode 5, designed as a ground, is connected in an electrically-conductive manner to the measuring unit 2. When current flows because of the electrical voltage that is applied by the measuring unit 2 to the electrode 3 and the counter electrode 5, current whose current intensity is detected as a measured value by the measuring unit 2, the leak site 82 in the sewer shaft 91 is detected because of water that has exited from the leak site 82.

Figure 27:
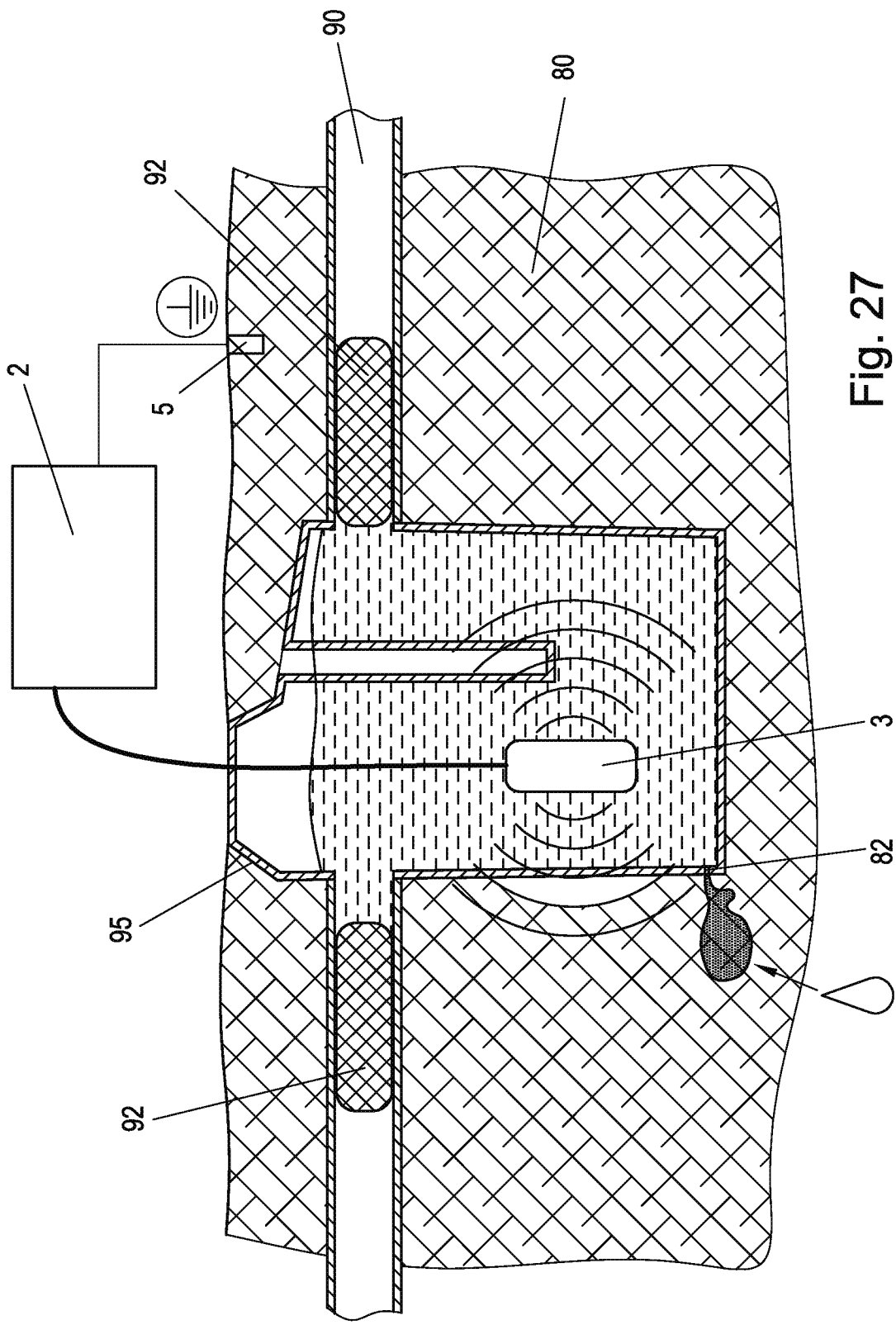
FIG. 27 shows the application of the method according to the invention in locating leaks in oil traps with a ground.

In the practical example, shown in FIG. 27, of the method according to the invention, a leak site 82 is located in an oil trap 95. Also in the example of FIG. 27, the oil trap 95 is sealed relative to the sewer line 90 by two impermeable cushions 92. The intensity of the electrical current flowing between the electrode 3 and the counter electrode 5 that is designed as a ground is detected as a measured value by the measuring unit 2 and indicates that water has exited from the leak site 82 in the jacket of the oil trap 95.

Figure 28:
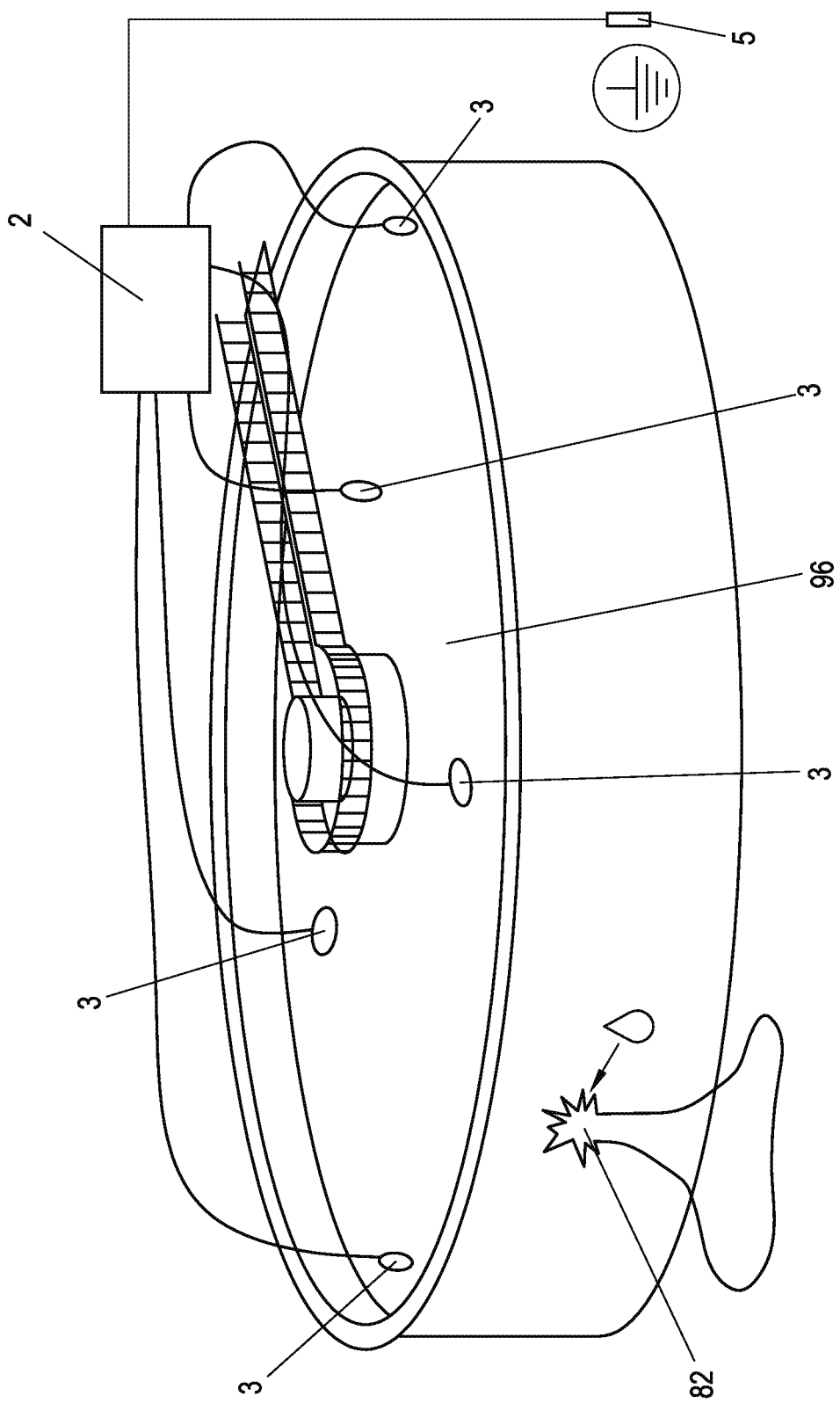
FIG. 28 shows the application of the method according to the invention in locating leaks in filter beds with a ground.

The method according to the invention can also be used to test and monitor the leak tightness of a (waste-water) filter bed 96. FIG. 28 shows this. When current flows between one of the electrodes 3 and the counter electrode 5, which is designed as a ground, based on electrical voltage applied (simultaneously or in succession) to one or more of the electrodes 3 of the measuring unit 2, the presence of water is detected. Because of the use of multiple electrodes 3 connected to the measuring unit 2, it can also be detected where a leak site 82 of the filter bed 96 lies.

In summary, an embodiment of the invention can be described as follows:

In a method for detecting the presence of water or additional water, which exists because of a leak, the following steps are carried out:

Attaching at least one pair of electrodes 3, 5 to/in an object, to/in the presence of water is to be determined, Applying an electrical voltage between the electrodes 3, 5, Testing whether electrical current or electrical current that is increased relative to a basic current flows between the electrodes 3, 5, and Detecting the presence of water in the case of flowing current.

When implementing the method, at least two electrodes (3, 5) are used, wherein one electrode (5) can be a ground. The electrodes (3, 5) are arranged separated from one another. D.c. or a.c. voltage is applied to the electrodes (3, 5) by a device (2). The device 2 detects a measured value corresponding to the intensity of the current flowing between the electrodes 3, 5.

The invention claimed is:

1. A method for detecting a presence of water, the method comprising:
attaching at least two electrodes to an object where the presence of water is to be detected;
connecting a ground that is a counter electrode to a measurement device;
applying an electrical voltage between the respective at least two electrodes attached to the object and the ground that is the counter electrode;

measuring, by the measurement device, electrical current flowing between the respective at least two electrodes attached to the object and the ground that is the counter electrode;

comparing the respective measured electrical current to a predetermined basic current that flows between the respective at least two electrodes and the ground that is the counter electrode when water is not present;

detecting the presence of water in a case in which the respective measured electrical current exceeds the basic current; and performing a cross-measurement of current flowing between various electrodes of the at least two electrodes, and using the cross-measurement current values to locate the water, in a case in which the presence of water is detected, wherein when the cross-measurement of the current is performed to take into account a humidity and/or temperature of the object, and wherein the locating of the water is performed using conductivities stored in a database.

\* \* \* \* \*